United States Patent
Hansen (10) Patent No.: US 8,683,193 B1
(45) Date of Patent: Mar. 25, 2014

(54) STRICT COMMUNICATIONS TRANSPORT SECURITY

(71) Applicant: Robert Hansen, Austin, TX (US)

(72) Inventor: Robert Hansen, Austin, TX (US)

( * ) Notice: Subject to any disclaimer, the term of this patent is extended or adjusted under 35 U.S.C. 154(b) by 0 days.

(21) Appl. No.: 13/783,224

(22) Filed: Mar. 1, 2013

(51) Int. Cl.
*H04L 29/06* (2006.01)

(52) U.S. Cl.
USPC .......................................... 713/153; 726/22

(58) Field of Classification Search
USPC .................... 726/11, 22–24; 713/188, 153
See application file for complete search history.

(56) References Cited

U.S. PATENT DOCUMENTS

| 7,509,490 B1* | 3/2009 | Hsu et al. ................... 713/162 |
| 2010/0235918 A1* | 9/2010 | Mizrahi et al. ................ 726/25 |
| 2013/0006897 A1* | 1/2013 | Jain et al. ..................... 706/12 |

* cited by examiner

*Primary Examiner* — Ali Abyaneh
(74) *Attorney, Agent, or Firm* — Mark R. Hennings (57) ABSTRACT

Strict transport security controls are arranged to detect a first navigation command of a network-enabled application to navigate from a secure connection established with a first network address and to navigate to a second network address using an unsecure reference. A filter is used to filter, in response to the detection of the first navigation command, referring information in a second navigation command used to establish a second address secure connection with a device having the second network address. The strict transport security controls service is optionally arranged to provide a warning signal upon detecting formation of the second navigation command.

27 Claims, 6 Drawing Sheets

STRICT COMMUNICATIONS TRANSPORT SECURITY

BACKGROUND

Network-enabled applications are applications that use communication networks to share information between various devices, each of which might be operated by the same or different user(s). The network-enabled applications include applications such as browser engines, messaging interfaces, remote desktops, and the like that allow users to easily browse, select, and manipulate items being viewed using a network-enabled application. The network-enabled application receives one or more communications (such as code for instantiating webpages) from a service provider that is often encoded in the form of a language (such as the hypertext markup language HTML), which contains elements that describe the structure and functionality of the content that is received by the content user.

The communication networks (such as the Internet) that are used by the networked-enabled applications are often physically or otherwise unsecured. Accordingly, encryption is often used to reduce the likelihood that the communications across the unsecured networks are observed, intercepted, and/or modified by third parties who often would try to exploit the communications. To reduce the opportunity for such exploits, a secure session can be established by networked-enabled applications using a secure socket layer (SSL) to encrypt communications that transpire during a secure session. However, the SSL facility can be compromised by third parties by using exploits related to switching between secure and unsecure transport modes.

DETAILED DESCRIPTION

The following discussion is directed to various exemplary embodiments of the disclosure. Although one or more of these exemplary embodiments may be preferred, the exemplary embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical, optical and/or wireless connection. Thus, if a first device couples to a second device, that connection can be made through a direct connection, or through an indirect connection via other devices and connections.

The term "domain" as used herein refers to either a domain or a portion of the domain ("subdomain") if any. Thus, the term "subdomain" can be used to refer to a portion of the "domain." A subdomain can be, for example, a domain name system (DNS) server record. For example, the name "www.example.com" can be used in a localized context to refer to a domain (notwithstanding the fact that "www.example.com" is itself a subdomain of "example.com"). While net-enabled applications such as browsers follow a "same origin" policy and tend to use the longer version "www.example.com" as an origin domain name, the net-enabled applications also use the shorter version "example.com" for certain purposes (such as for cookies that are set with the domain switch). Thus all subdomains of the domain "example.com" include "no-subdomains" (such as "http://example.com/" and "http://whatever.example.com/") and include the more-specific subdomains (such as www.example.com). The term "render" can be used to describe a change rendered in the logical structure of a Document Object Model (DOM) as well as a graphical rendering of the DOM element. The term "portion" means an entire portion or a portion that is less than the entire portion.

Figure 1:
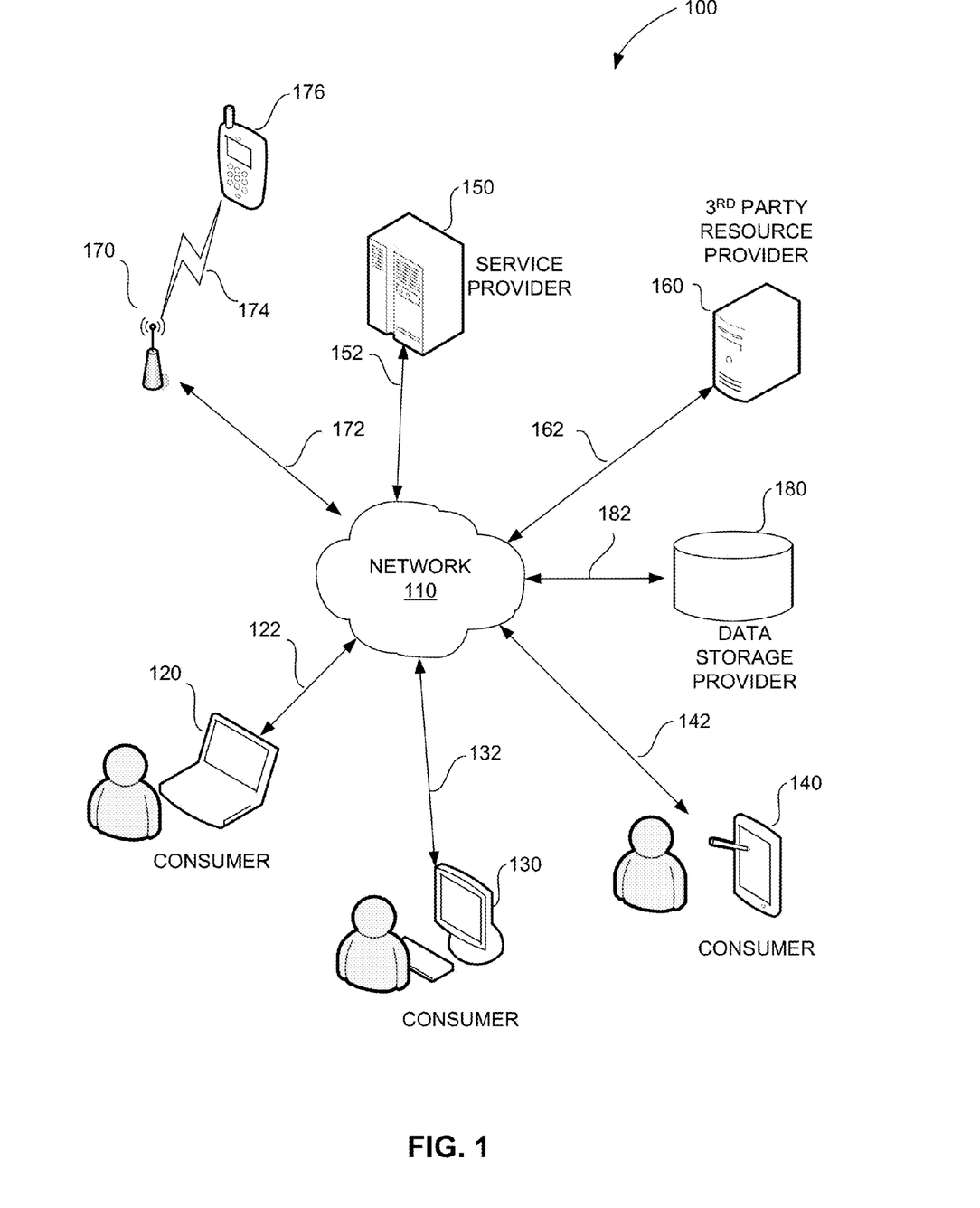
FIG. 1 is a network diagram illustrating a network that is suitable for practicing aspects of strict transport security controls in accordance with exemplary embodiments of the disclosure.

FIG. 1 is a network diagram illustrating a network that is suitable for practicing aspects of strict transport security controls in accordance with exemplary embodiments of the disclosure. Network system 100 includes consumer 120, 130, and 140 (machines, for example), service provider 150, third party resource provider 160, cellular communications provider 170, and data storage provider 180. Consumers 120, 130, and 140 access and communicate with network 110 using communication links 122, 132, and 142 respectively. Each of the consumers 120, 130, and 140 can be (or internally provide functions of) the (illustrative) computing device 200 discussed below with reference to FIG. 2.

Network 110 typically includes a publically accessible network such as the Internet, but other networks (including private networks) can be used. Thus, network 110 is typically a collection of networks (and gateways) that typically use a TCP/IP (transmission control protocol/Internet protocol) suite of protocols for packet-based communications. The Internet typically employs high-speed data communication lines between major nodes or host computers, but even bandwidth between the major nodes is subject to degradation through satellite outages, hardware faults, denial of service attacks, oversubscription of services, and the like. The network connections are shown for the purpose of illustration, and other ways of establishing a communications link between computers (such as using firewalls, as discussed below) can be used.

Consumers 120, 130, and 140 access the network 110 to access networked service providers of services such as service provider 150, third party resource provider 160, cellular communications provider 170, and data storage provider 180. Service provider 150 accesses network 110 via communication link 152, whereas third party resource provider 160 accesses network 110 via communication link 162. Cellular communications provider 170 accesses network 110 via communication link 172 and provides, for example, further connectivity to cellular devices 176 via a cellular network 174. Data storage provider 180 accesses network 110 via communication link 182 to provide, for example, secure backup systems for consumer 120 data. The actual data processing systems of network system 100 may include additional servers, clients, peers, and other devices not illustrated. Each of the service provider 150, third party resource provider 160, cellular communications provider 170, cellular devices 176, and data storage provider 180 can be (or internally provide functions of) the (illustrative) computing device 200 discussed below with reference to FIG. 2.

Figure 2:
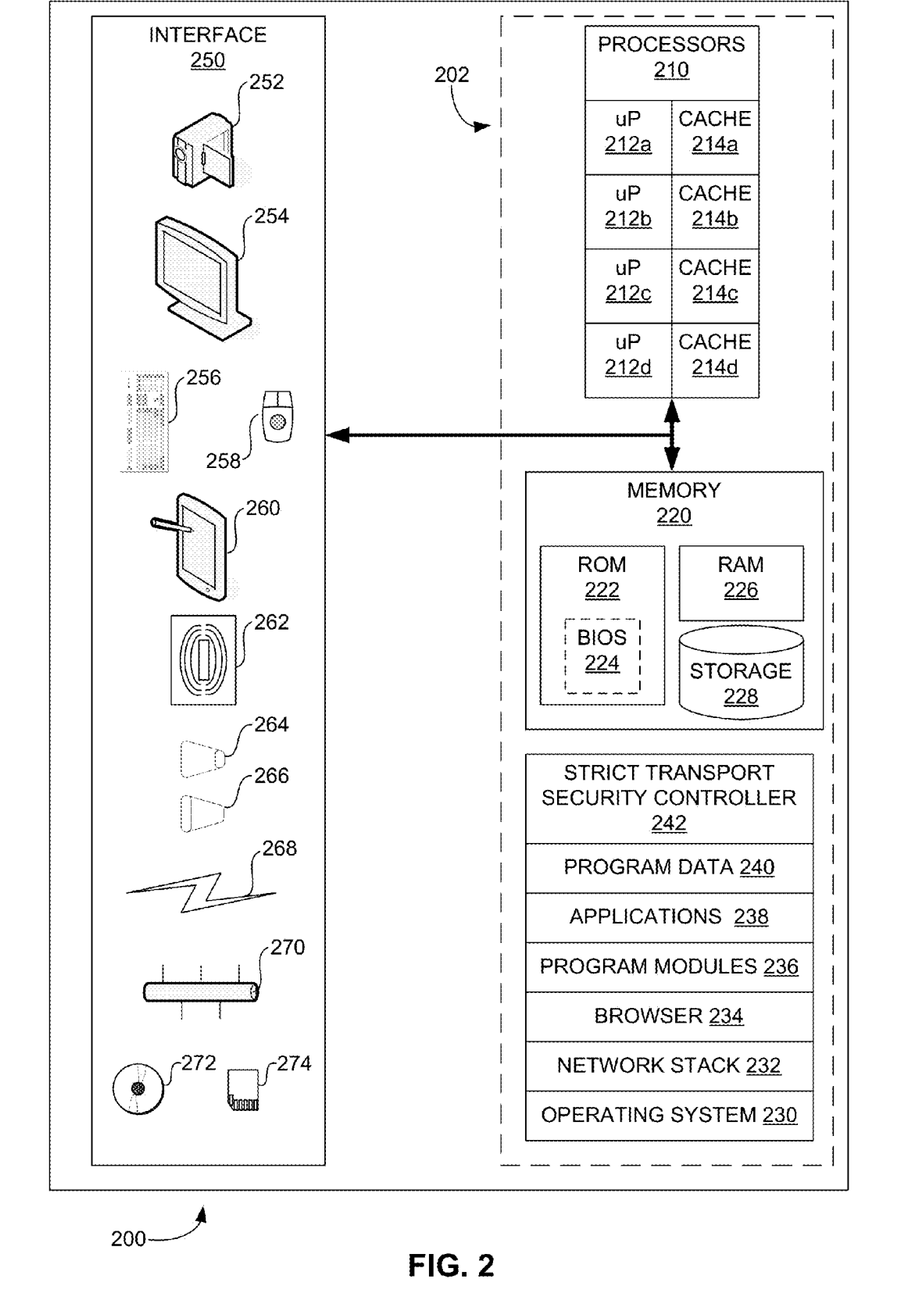
FIG. 2 shows an illustrative computing device in accordance with exemplary embodiments of the disclosure.

FIG. 2 shows an illustrative computing device 200 in accordance with exemplary embodiments of the disclosure. For example, the computing device 200 includes a processing system 202 that is arranged to perform specific tasks in response to applications 238 and program data 240. Processing system 202 is often incorporated into a computing device such as a mobile device, a personal digital assistant, a personal computer, a dedicated web-enabled appliance, a kiosk terminal, automotive electronics, or any other type of networked electronic system or subsystem.

The processing system 202 includes processors 210 and memory 220. Processors 210 may include one or more microprocessor (uP) cores 212a, 212b, 212c, and 212d, each of which is optionally coupled to a respective, local cache 214a, 214b, 214c, and 214d. Memory 220 includes a ROM (read-only memory) 222, RAM (random-access memory) 226, and storage 228 (such as a "hard" disk). ROM 222 optionally includes BIOS (basic input/output system) 224, which typically includes low-level firmware-based device drivers 473 for accessing, for example, low-level, hardware-based elements of computing device 200.

Memory 220 includes instructions and data for executing (software) applications 238 (for example), that when executed by processing system 202, perform any suitable function associated with the computing device 200. For example, the processing system 202 executes software (including firmware) and data components such as operating system 230, network stack 232, browser 234, program modules 236, applications 238, program data 240, and strict transport security controller 242.

Processing system 202 is accessible to users and non-local components using interface 250. Interface 250 provides a user interface that is typically arranged to provide output to and receive input from the user during the execution of the software applications 238. The output to the user is provided by devices such as the display 254 (including indicator lights and image projectors), a speaker 264, vibrations 262, and the like. The input from the user is received using keyboard 256, mouse (and/or trackball) 258, touch/stylus screen 260, audio input 266 and/or video input 252. Other devices can be used such as keypads, switches, proximity detectors, and the like.

The interface 250 is also arranged to transmit communications to and from other computers across a network. Wireless link 268 permits communications using a modulated optical and/or electromagnetic carrier (such as cellular telephone communications). Cabled link 270 permits communications over a wired and/or optical link (such as optical Ethernet and/or Ethernet). The wireless link 268 and cabled link 270 are optionally employed between other network-enabled devices to establish wide-area networks, local-area networks, private networks, and the like. Additionally, tangible media such as disk 272 or "flash" ROM 274 (and the like) are used to store data and instructions and are read from and/or written to by interface 250 in the course of execution of the strict transport security controller 242, for example. The media is or can be non-transitory media.

In exemplary embodiments of the disclosure, described below, the strict transport security controller 242 of service provider 150 is arranged to monitor the formation of network navigation commands and detect when a selected link references a destination that is unsecure (e.g., an HTTP page). When the strict transport security controller 242 detects the potential navigation to an unsecure context, the strict transport security controller 242, (for example) modifies the Referer (sic) header (including removing any or all of the Referer information) so that information from the secure context is not passed to the unsecure context via a Referer header. The strict transport security controller 242 is optionally arranged to provide an indication of the detected context shift to users and/or administrators of service providers.

Figure 3:
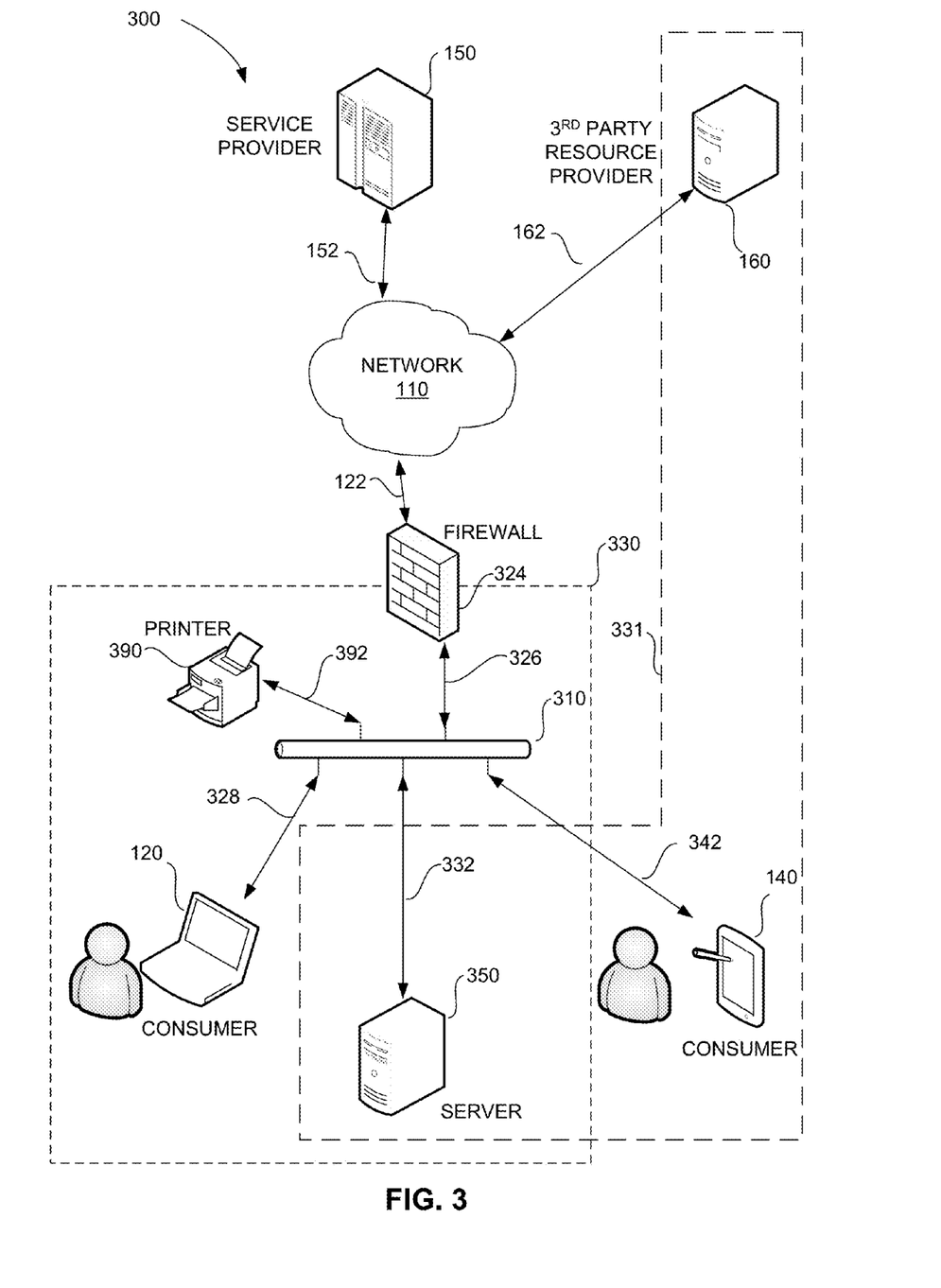
FIG. 3 is a network diagram illustrating in conjunction with FIG. 2 a network that includes strict transport security controls in accordance with exemplary embodiments of the disclosure.

FIG. 3 is a network diagram illustrating in conjunction with FIG. 2 a network that includes strict transport security controls in accordance with exemplary embodiments of the disclosure. Network system 300 includes service provider 150 and third party resource provider 160, as discussed above. Service provider 150 is arranged to provide networked content (such as services, data and/or applications, and the like) to consumer 120 via network 110. The content and services are generally provided in the form of communications such as webpages, where the webpages (and other communications) often contain references (e.g., "links") to "external" resources that are to be provided by the third party resource provider 160 (which is also a networked service provider). The content and services can include banking, information storage, search engines, blogging, and the like, and can be networked via the Internet or private (such as a virtual private) network.

Service provider 150 is a server (or a set of servers that are presented as a single server or a "virtual" server for processing requests). The consumers 120 and 140 are typically clients with respect to the server (e.g., service provider 150 and server 350). The consumer 120 and server 350 are networked resources such as, for example, computers that are networked together in a trusted zone 330. A second trusted zone 331 can be arranged having, for example, consumer 140, server 350, and third party resource provider 160 in the trusted zone 331, but excluding consumer 120 from the trusted zone 330. A trusted zone is an exemplary group of network resources (e.g., "machines") that have trusted communications amongst the network resources of a particular trusted zone (such as trusted zone 330) associated with the network-enabled application. The machines of a trusted zone have trusted communications by using, for example, a (nominally) security facility such as the secure socket layer (SSL).

Trusted zones 330 and 331 are protected against attacks from networked resources (such as third party resource provider 160) by firewall 324, which processes communications from the consumers 120 and 140 across the network 110 by providing network address or port address translation, and/or by providing proxy services. Network 310 provides a link 326 for communicating with the firewall 324, a link 328 for communicating with consumer 120, a link 332 for communicating with server 350, a link 342 for communicating with consumer 140, and a link 392 for communicating with printer 390.

For example, the consumers 120 and 140 are arranged as local network resources that are networked together in separate trusted zones using a firewall 324 and/or authentication such that the network resources are otherwise inaccessible to an external attack. A trusted zone can include network resources from within a private address space (that includes consumers 120 and 140, for example) as well as network resources that lie outside of the private address space. Thus, the trusted zone can include network resources from a virtual private network where network resources are securely accessed over a public or private network.

As discussed below, various resources with public and private networks are potentially subject to malicious code that attempt to capture referring headers sent with the trusted zone. As also disclosed herein, resources (such as a proxy) can perform filtration of header Referer information on behalf of another network resource that is subjected to the malicious code. The proxy is arranged to act as an intermediary and (in a strict transport security-enabled session) receives and decrypts communications from a client, filters the received communications, and then encrypts and transmits the communications to the server (of the client).

Accordingly, communications can be sent and received with a (nominally) secure level of protection from disclosure of sensitive information. For example, a service provider 150 (such as a bank) can receive HTTP (hypertext transfer protocol) requests from one or more consumers (e.g., 120 and 140). The requests can be transmitted (nominally) securely using a secure protocol such as HTTPS (HTTP secure). Accordingly, the URL structure in this example that is sent to the bank may contain sensitive information (including account numbers, names, amounts, and the like) that adverse third parties would seek to exploit (which is nominally protected by the SSL of the HTTPS protocol).

An operative safety function of the HTTPS protocol is that when a link is followed (e.g., in web navigation) from HTTPS to HTTP, the Referer (sic) header is automatically removed by the browser. The automatic removal nominally reduces the likelihood that the URL header can be used to leak sensitive information to untrustworthy domains or to a man in the middle who may be passively "watching the wire" (e.g., monitoring web logs on the second server, which contain Referer header information). Accordingly, the HTTPS-to-HTTP Referer header stripping technique is typically used for self-protection. For example, Intranet websites, webmail systems and administrative consoles conventionally use this technique to hide internal path names which can often contain extremely sensitive information.

As disclosed herein, certain information available to a first session using a TLS (transport layer security) or any cryptographic layer is subject to disclosure (and thus exploitation) to other sessions of the TSL being hosted by a user machine. As an example of a defense against such exploitation, the Hodges' Strict Transport Security (which is also referred to as HTTP Strict Transport Security, HSTS, or simply STS) is a technology designed to stop Man-in-the-Middle attacks such as "SSLstrip" (which is so-named because the ability to "strip" the "s" from "https" so that users are downgraded to an "http" level of security). SSLstrip is a "hack" (e.g., malicious code) that can change navigation URLs (universal resource locators) from the (nominally) secure "https://" (HTTP secure) protocol to the relatively unsecure "http://" protocol. SSLstrip opportunistically makes connections established by a session readable by downgrading the user such that the referrer headers (and content in general) are visible.

The STS protocol is arranged to set a security flag in browsers that (when operating in a session using HTTPS) support the optional HTTP header that provides the functionality to instruct the browser at the next time (assuming, e.g., a timeout period has not elapsed) a connection is established the connection should be established using an HTTPS URL (and not an HTTP URL) regardless of the nature of the referring link. Thus, despite the fact that a link such as an "href" (HTTP reference) explicitly reads "http://example.com/," the browser instead directs the navigation (e.g., follow a new link) to "https://example.com/" whenever the STS security flag has been set. The STS security flag conventionally remains set until (for example) either the STS security flag duration value expires or the user clears the STS security flag in their browser. Thus, the browser assumes a relatively safe "HTTPS-to-HTTPS" navigation "jump" has occurred and (conventionally) does not remove the Referer header information.

Despite the intention of providing additional security using the STS protocol, an unintended consequence of the STS protocol is that the STS protocol can be manipulated in order to expose information leakage. For example, hackers have directed malicious code to exploit the STS protocol itself to expose sensitive information (where such exposure was typically less likely to succeed without using the STS protocol).

As described below with respect to FIG. 4, the strict transport security controller is arranged to frustrate, for example, an exploit that attempts to stop the automatic removal of HTTP Referer header information. The strict transport security controller 242 is arranged to monitor, for example, the setting of a transport security flag (such as the STS security flag), to detect during the formation of a command (e.g., any time before the command is transmitted outside of a trusted zone) that includes a change in a target address in a communication from an unsecure setting (such as an HTTP reference) to a secure setting (such as an HTTPS reference) when an associated header security flag (such as the STS security flag) is set to indicate that secure communications are to be used. Further, the strict transport security controller can be arranged to modify the status of the transport security flag in response to detecting a (potential) navigation from a secure-to-unsecure context.

Figure 4:
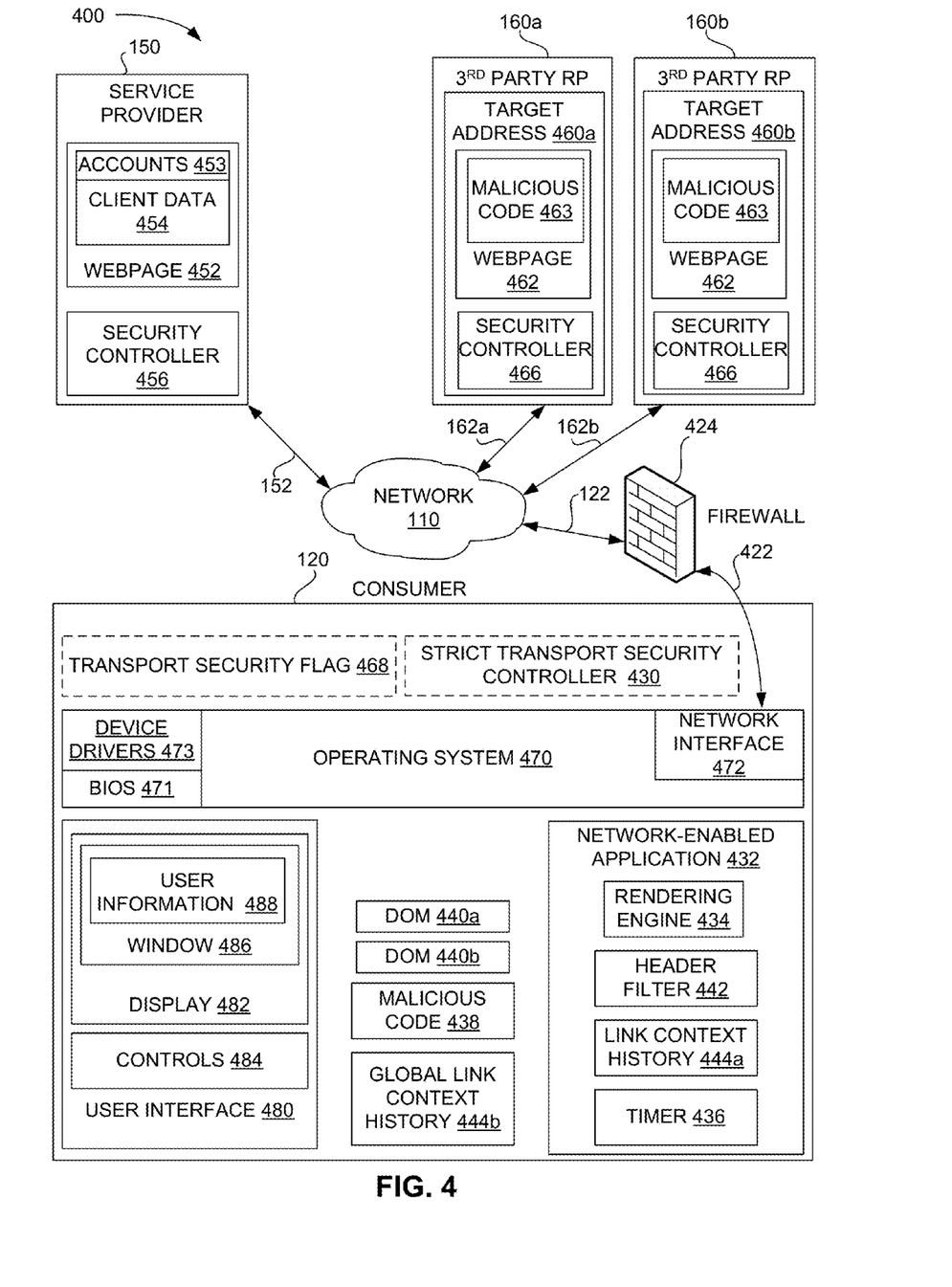
FIG. 4 is a logic diagram illustrating a network resource having a strict transport security controller in accordance with exemplary embodiments of the disclosure.

FIG. 4 is a logic diagram illustrating a network resource having a strict transport security controller 430 in accordance with exemplary embodiments of the disclosure. Strict transport security system includes, for example: consumer 120, service provider 150, and third party resource providers (3$^{rd}$ Party RPs) 160a and 160b. Consumer 120 is typically arranged as a client machine that is arranged to communicate (e.g., securely) with servers across a network 110 using communication links 122, firewall 424, and communication link 422. Third party resource providers 160a and 160b are arranged to communicate with network 110 using communication links 162a and 162b respectively.

Consumer 120 typically includes a network-enabled application 432 that is arranged to conduct communications between service provider 150 and consumer 120. For example, network-enabled application 432 includes a browser such as Chrome, Firefox, Internet Explorer, and the like. A user performs an action such as following a bookmark, or clicking on a local link, opening a Word or PDF document, entering a URL (universal resource locator) or IP (Internet protocol) address, entering account numbers, or selecting an action to perform on accounts (or to access services) hosted (e.g., including provided or conveyed) by service provider 150, and the like.

Service provider 150 responds by sending a communication to the consumer 120. The communication is received by the network interface 472 of operating system 470 and the communication is passed to the network-enabled application 432 for decoding and rendering, for example, using a window 486 in the display 482.

The communication is often a webpage written in a markup language, although other formats can be used such as style sheets, JavaScript reference, and the like. The webpage often contains elements that address content provided by the service provider 150 as well as content provided by one or more third party resource providers 160 (such as third party resource providers 160a or 160b). The references in the received communication are, for example, instantiated using a DOM 440 (document object model such as DOM 440a or 440b) as the network-enabled application 432 parses the received communication in accordance with the format used to encode the information encoded in the received communication. The DOM 440 can be arranged as a parent DOM that is associated with one or more children DOMs, wherein each of the DOMs can be associated with a network resource that is determined by the received communication.

As the network-enabled application 432 parses the received communication from the service provider 150, the network-enabled application 432 constructs a DOM 440 (such as DOMs 440a and 440b) that delineates the structure and the function of the encoded information. The DOM 440 is arranged to render both content of requested third party resources (such as third party resources 460b) and local references on the same website, for example. The rendered content can be used to manage a window 486 of a webpage (conveyed by the encoded information) for display in the display 482 (typically via BIOS 471 of the operating system 470). The display 482 is used to provide visual indications to a user and to prompt (e.g., query) the user for input. The user input is captured using controls 484 (such as by a keyboard and/or a mouse) of the user interface 480.

Window 486 is a (e.g., computer program) application window that is arranged to display program output and to help capture user input. Window 486 is, for example, a window of a network-enabled application 432 and is associated with user information 488 that is arranged to be viewed and/or manipulated by a user using controls 484. The user information 488 (in whole or in part) is included in the received communication provided by the service provider 150 as, for example, display object that is rendered by rendering engine 434. The user information 488 is typically rendered in accordance with a DOM (such as DOM 440a). User interface 480 is used, for example, by a user to view and manipulate user information related to services provided by the service provider 150. The user information includes information such as services selected by the user, user account information, assets, inventories, contact lists, and sensitive information that is not generally known by the public.

In exemplary embodiments of the disclosure, a user of a consumer (e.g., consumer 120) is arranged to access services provided of service provider 150 by providing to and receiving user information 488 from service provider 150. Because the user information 488 might include sensitive information (such as a user name, password, verification codes, financial account data, and the like), the consumer 120 and the service provider take protective actions to reduce (and/or eliminate) the possibility that the information is disclosed. For example, the service provider 150 is arranged to initiate a secure communication session with user 120 using a facility that uses encryption such as TLS (or SSL). Accordingly, a secure channel (e.g., "tunnel") can be provided across an open, non-secure network (e.g., network 110). The service provider 150 is arranged to provide appropriate commands to a network-enabled application 432 (such as a browser).

In a scenario of where the communications between the service provider 150 and the consumer 120 are encrypted (and, for example, conducted using a protocol such as HTTPS), the webpage displayed in window 486 may be protected using TLS and STS security. However, the window 486 may contain a link to a third party resource provider (such as third party resource provider 160a and/or 160b), which can be exploited to undermine the level of security intended by the host administrators of the service provider 150.

In a typical situation, the user of consumer 120 can select (e.g., click on) a link that points to an unsecure (e.g., HTTP) webpage. When the user clicks on the link, navigation from the displayed HTTPS webpage to a to-be-loaded HTTP webpage commences. Because the navigation transitions from an HTTPS webpage to an HTTP webpage, the Referer header (which may contain sensitive information from the bank) is stripped (or otherwise rendered innocuous or not included) by header filter 442. Thus, the Referer header (which may contain sensitive information) is not sent by the network-enabled application 432 (e.g., browser) of the consumer 120 to the third party resource provider (e.g., 160a).

The strict transport security controller 430 (such as strict transport security controller 242) of service provider 150 is arranged to control certain security aspects of networked communications by the network-enabled application. For example, network navigation commands are monitored to determine whether the communications are conducted using HTTP (e.g., unsecure) or HTTPS (e.g., relatively secure). When a selected link references a destination that is unsecure (e.g., am HTTP page), the strict transport security controller 430 is arranged to detect a navigation from a secure context (e.g., HTTPS) to an unsecure context, and, (for example) directs the header filter 442 to modify the Referer header (including removing any or all of the Referer information) so that information from the secure context is not passed to the unsecure context via a Referer header. The strict transport security controller 242 is optionally arranged to provide an indication of the detected context shift to users and/or administrators of service providers.

The strict transport security controller 430 is arranged to reduce the effectiveness of exploits that attempt defeat the removal of the Referer header. Third party resource provider 160a, for example, may attempt to defeat the removal of the Referer header by including an exploit that is intended to defeat STS (as discussed above). Generally, the STS is arranged to set the transport security flag 468 to a status that indicates that to any browser supporting the optional HTTP header feature that the browser is to connect over HTTPS for any duration a site (such as by the connection established with the service provider 150) chooses to set. However, this security can be by-passed by a malicious website that installs malicious code such as SSLstrip (which contains code that can, for example, remove or reduce STS security) at a point in time before a (legitimate) website sets the transport security flag 468 (which, e.g., would otherwise prohibit SSLstrip from being installed). When the STS security is by-passed, it may create a false impression of security that uses rely upon to their detriment (e.g., as the exploit may further mine data from communications that are otherwise thought to be secure).

As an example of how the malicious code (e.g., that is intended to defeat the effectiveness of the STS) is used to attack a victim machine, the user of consumer 120 can select (e.g., click on) a link that points to an unsecure (e.g., HTTP) webpage. When the user clicks on the link, navigation from the displayed HTTPS webpage to a to-be-loaded HTTP webpage commences. Because the navigation transitions from an HTTPS webpage to an HTTP webpage, the Referer header is stripped by header filter 442. However, the navigated-to website forces a redirection to an HTTPS webpage that shares that same address as the navigated-to HTTP webpage. The redirected-to HTTPS webpage the sets an STS header (in a communication that is sent to the browser of consumer 120) so as to force the browser of consumer 120 to always connect to the navigated-to address (of the malicious website) using HTTPS within a specified time-period (which is to be enforced by timer 436, for example). When the browser of consumer 120 attempts to visit the same malicious website a second time (by, for example, either a user selecting a link or the exploit executing a JavaScript code function such as "history.go(−1)"), the browser of consumer 120 navigates to the malicious website using HTTPS (instead of the HTTP specified in the clicked-on link and/or entry in a browser history). Because the navigation is an HTTPS-to-HTTPS navigation, the Referer header is not stripped (and thus the header filter 442 is not invoked, and sensitive information can be leaked using the Referer header).

The strict transport security controller 430 of consumer 120 is arranged to, for example, reduce or eliminate the ability of malicious code to defeat the effectiveness of STS. In one example, the strict transport security controller 430 is arranged to monitor each target address that is selected as a navigation target that is presented in secure context (e.g., a link that is clicked on from a webpage that was retrieved using HTTPS) and to determine whether the selected target address 460b is arranged to be accessed using an unsecure context (e.g., the link points to a webpage by using an address that points to an HTTP-presented webpage). When the target address 460b originates using a secure context and is pointing to an unsecure address, the strict transport security controller 430 directs the header filter 442 to strip the Referer header information (e.g., regardless of the state of the transport security flag 468) before transmitting a communication to the resource (e.g., webpage 462) identified by the target address 460b. The resource (e.g., webpage 462) identified by the target address 460b may contain malicious code 463 (such as SSLstrip). When the target address originates using a secure context and is pointing to an unsecure address, the strict transport security controller 430 optionally generates a warning signal, e.g., for alerting system administrators and security personnel of a potential exploit.

Because the header information is stripped off, the strict transport security controller 430 can (for example) direct the consumer 120 to connect to the target address 460a using either a secure (e.g., HTTPS) or an unsecure (e.g., HTTP) context (via security controller 466, for example). Thus, a secure context is indicative of a communication established, e.g., using HTTPS and an unsecure context is indicative of a communication established, e.g., using HTTP. The selection can be made in accordance with a degree of established trust with the target website and using other factors available to the strict transport security controller such as the presence of previous, uneventful contacts with the target website.

In another example, a link context history 444a is maintained in association with a network-enabled application 432, where entries in the link context history 444a are used to identify whether a target address has been previously visited using (or otherwise having been mapped as having) a secure-to-unsecure context (e.g., HTTPS-to-HTTP). If a target address has no associated entry, a determination of the current context is made and stored as an entry in the table. If a subsequent access to a target address 460b that has been identified as having been previously accessed using a secure-to-unsecure context, the header filter 442 is directed to strip the Referer header information from ensuing communications transmitted from the network-enable application 432 to the resource identified by the target address. If a subsequent access to a target address 460b that has been identified as having been previously accessed using a secure-to-unsecure context, the strict transport security controller 430 optionally generates a warning signal, e.g., for alerting system administrators and security personnel of a potential exploit.

In yet another example, a link context history 444b is maintained for networked communications that are transmitted from consumer 120. The entries in the link context history 444b are used to identify whether a listed target address has been previously visited using a secure-to-unsecure context. Thus, the link context history 444b includes an indication of a level of a security context associated with each of the network addresses stored in the navigation history. If a subsequent access to the target address 460b that has been identified as having been previously accessed using a secure-to-unsecure context, the header filter 442 is directed to strip the Referer header information from ensuing communications transmitted from the network-enable application 432 to the resource identified by the target address. If a target address has no associated entry, a determination of the current context is made and stored as an entry in the table. If a subsequent access to a target address that has been identified as having been previously accessed using a secure-to-unsecure context, the header filter 442 is directed to strip the Referer header information from ensuing communications transmitted from the consumer 120 to the resource identified by the target address. If a subsequent access to a target address that has been identified as having been previously accessed using a secure-to-unsecure context, the strict transport security controller 430 optionally generates a warning signal, e.g., for alerting system administrators and security personnel of a potential exploit.

Figure 5:
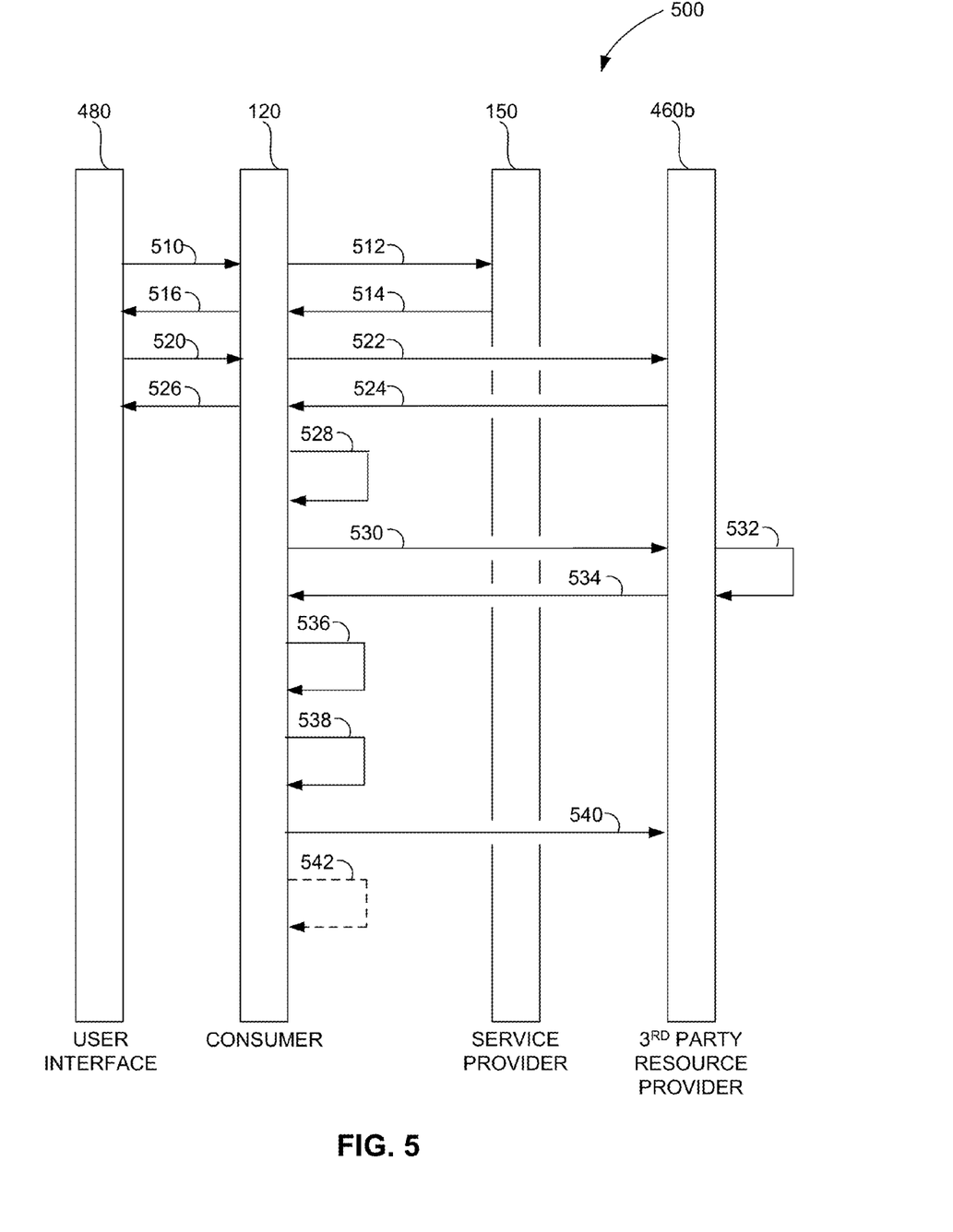
FIG. 5 is a signaling diagram illustrating in conjunction with FIG. 4 operation of strict transport security controls architecture in accordance with exemplary embodiments of the disclosure.

FIG. 5 is a signaling diagram illustrating in conjunction with FIG. 4 operation of strict transport security controls architecture in accordance with exemplary embodiments of the disclosure. Signaling diagram 500 illustrates communications transmitted and received between and amongst the user interface 480, for example, consumer 120, service provider 150, and third party resource provider 460b. A user at user interface 480 sends a command 510 via an external network to consumer 120 to (eventually) generate a request 512 for content (or other services) from service provider 150. For example, a user may want to access and manipulate the user's client data 454 in accounts 453.

In response, the security controller 456 of service provider 150 is arranged to receive user credentials for logging in (for example) and to securely (e.g., via HTTPS) transmit a webpage 452 for accessing the user's client data 454. The webpage 452 is transmitted via the external network as communication 514 that includes an object (such as user interface 480) for requesting and receiving client commands from the user at user interface 480. The client commands can include client information 488 that is related to the selection of accounts, account balances, paying bills, credit card information, and the like.

When the communication 514 is received and parsed (for example), consumer 120 constructs (for example) a DOM 440. The DOM 440 is rendered and the results are sent via communication 516 to user interface 480 for display in window 486. A user at user interface 480 can select navigation links (for example) conveyed by the communication 514 via command 520. The navigation link can point to an unsecure target webpage 462 of a seemingly innocuous third party resource provider 460b, where the target webpage 462 contains malicious code 463. The consumer 120 then forwards an navigation command 520 to the service provider 150 using communication 522 (e.g., an HTTP request) wherein the communication 522 has the Referer header information removed (because of the secure-to-unsecure context change).

When the third party resource provider 460b receives the communication 522, the third party resource provider 460b responds with communication 524, which provides (for example) a webpage to be conveyed to consumer 120. Assuming the third party resource provider 460b contains malicious code that is intended to defeat STS security, the third party resource provider 460b provides via communication 524 a webpage containing malicious code.

Upon receiving the communication 524 (that includes malicious code 438), the consumer 120 parses the communication 524 and updates the DOM 440 in response. In command 526, the user interface 480 is instructed to display a portion of the received webpage.

In operation 528, the consumer 120 browser executes a redirection command (e.g., as directed by the updated DOM) to replace an unsecure link to the target webpage (e.g., http://untrusted-3rd-party.com) with a secure link (e.g., https://untrusted-3rd-party.com). The intent of the redirection using the secure link is to "confuse" the browser into not stripping Referer header information (e.g., because of the https-to-https navigation context). The HTTPS request to accomplish the redirection is sent via communication 530. The third party resource provider 460b is arranged to respond to the communication 530 by setting an STS value in a header of a reply communication to always connect to the target webpage (untrusted-3rd-party.com) using HTTPS (within the time period allowed by a timing variable). The reply communication (with the STS header commands) is sent to the consumer 120 via communication 534.

In operation 536, consumer 120 is commanded to access the third party resource provider 460b again by using the same target webpage address. The consumer 120 can be commanded to access the third party resource provider 460b again (for example) by operation of a subsequent user selection (not shown) of the link displayed in the user interface 480, or by operation of a JavaScript command such as "history.go(−1)."

In operation 538, the strict transport security controller 430 evaluates the command to access the target webpage of the third party resource provider 460b again to determine whether the target webpage has previously been accessed in an unsecure context (e.g., by using http://untrusted-3rd-party.com). If the target webpage has previously been accessed in an unsecure context, the header filter 442 is directed to strip Referer header information from subsequent communications to the webpage of the third party resource provider 460b.

After the Referer header information has been stripped from the response to be sent to the third party resource provider 460b, the response is sent via communication 540 to the third party resource provider 460b. For example, communication 540 can be an HTTPS request or any other request made using a suitable secure protocol.

In operation 542, a warning signal is optionally generated in response to the determination that the target webpage has previously been accessed in an unsecure context. In various exemplary embodiments, the protective actions taken by consumer 120 (in response to the warning signal, for example) can take a variety of forms. For example, the browser can provide a warning that potentially hazardous redirections have been encountered in association with the target webpage so the service provider can selectively take appropriate action. The appropriate action taken can also include providing a notification of a potential malicious element in a received webpage to a user, an administrator, a third-party security services provider, and others associated with the service provider 150.

Figure 6:
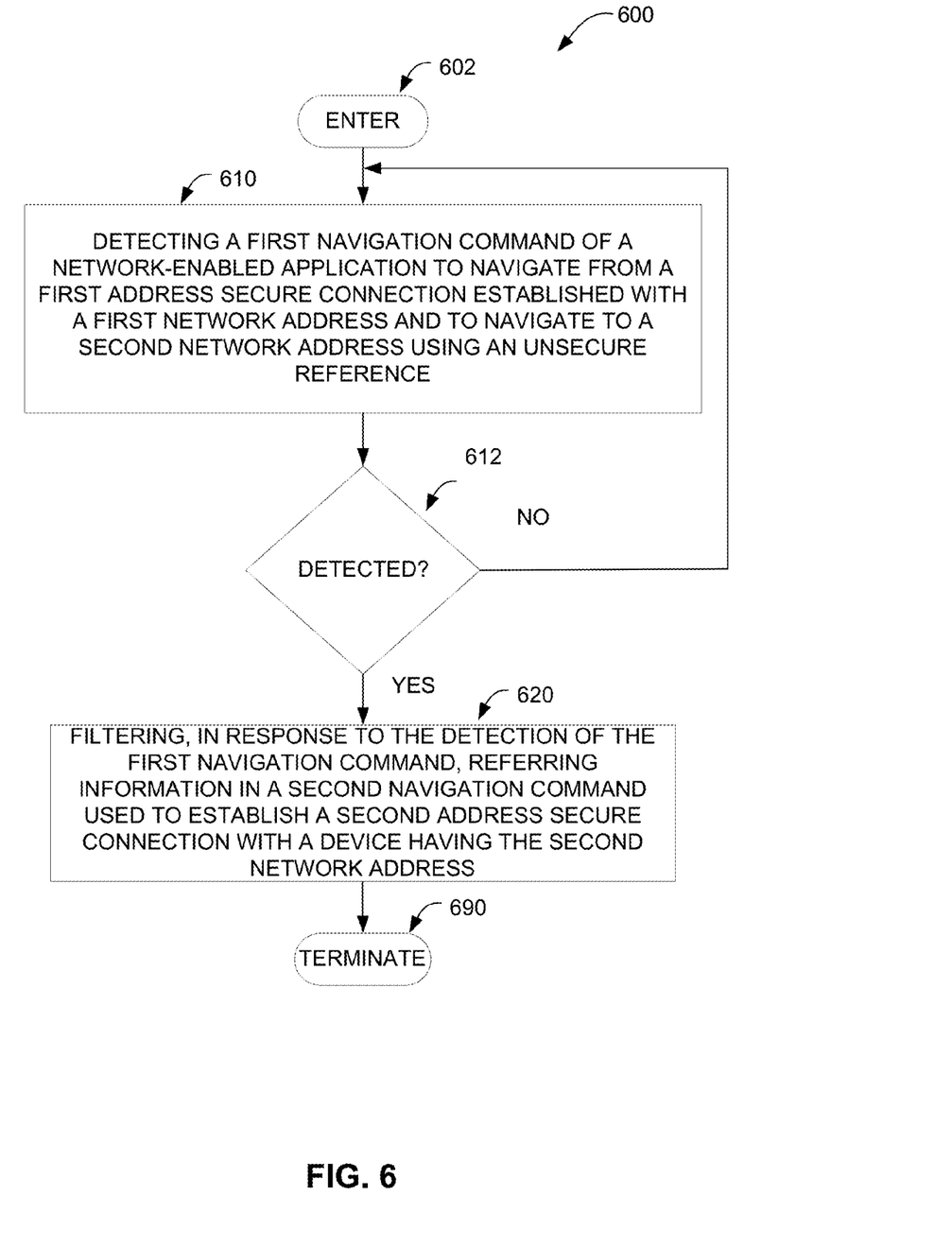
FIG. 6 is a flow diagram illustrating strict transport security controls architecture in accordance with exemplary embodiments of the disclosure.

FIG. 6 is a flow diagram illustrating strict transport security controls architecture in accordance with exemplary embodiments of the disclosure. The program flow illustrated herein is exemplary, and thus various operations (and various portions of the operations) within the program flow can be performed concurrently and/or in an order that is not necessarily the same as the program flow illustrated herein (including, for example, using logical substitutions and reordering made in accordance with DeMorgan's theorems and Boolean algebra). Program flow 600 begins at node 602 and proceeds to operation 610.

In operation 610, detecting a first navigation command of a network-enabled application to navigate from a first address secure connection established with a first network address and to navigate to a second network address using an unsecure reference is performed. For example, the detection can be in response to a request by the second website to use STS which strips referrer information due to an HTTPS-to-HTTP connection. Program flow proceeds to operation 612.

In operation 612, it is evaluated whether a detection of the first navigation command has been made. If the detection is made of the first navigation command, program flow proceeds to operation 620. If the detection is not made, program flow proceeds to operation 610, where (for example) navigation commands are formed (and the navigation commands can be monitored to detect a navigation to navigate from a secure connection established with a first network address and to navigate to a second network address using an unsecure connection).

In operation 620 filtering is performed (in response to the detection of the formation of the first navigation command) on referring information in a second navigation command used to establish a second address secure connection with a device having the second network address. For example, Referrer header information is filtered from the navigation command to help protect information that might be sensitive (including account numbers, nonces used to establish a secure session with the referring page, and the like). The filter can thus remove sensitive information that might otherwise have been transmitted when relying on the STS facility for security.

The various exemplary embodiments described above are provided by way of illustration only and should not be construed to limit the claims attached hereto. Those skilled in the art will readily recognize various modifications and changes that could be made without following the example exemplary embodiments and applications illustrated and described herein, and without departing from the true spirit and scope of the following claims.

The invention claimed is:

1. A method, comprising:
    detecting a first navigation command of a network-enabled application to navigate from a first address secure connection established with a first network address and to navigate to a second network address using an unsecure reference;
    detecting a change in a security setting of the second network address from an unsecure setting to a secure setting, wherein the second address secure connection is established in response to a redirection command transmitted from the second network address, wherein the redirection command includes a command to connect to the second network address using HTTPS (hypertext transfer protocol secure); and filtering, in response to the detection the change in a security setting of the second network address, referring information in a second navigation command used to establish a second address secure connection with a device having the second network address, wherein the referring information is included in a referrer header to be sent to the second network address; and wherein the detecting the first navigation command, the detecting the change in the security setting, and the filtering referring information occur in a client machine.

2. The method of claim 1, further comprising generating a warning signal in response to the detection of the change in a security setting of the second network address and taking a protective action in response to the warning signal.

3. The method of claim 2, wherein the protective action comprises instructing a network resource to perform filtering of the referring information in the HTTPS header.

4. The method of claim 3, wherein the network resource is a proxy.

5. The method of claim 4, wherein the network resource has a third network address that is different from a fourth network address of the machine hosting the network-enabled application, and wherein the third network address and the fourth network address communicate using STS (strict transport security).

6. The method of claim 1, further comprising consulting a navigation history to identify whether the second network address is associated with a mapping of secure-to-unsecure URLs (universal resource locators).

7. The method of claim 6, wherein the navigation history includes an indication of a level of a security context associated with each of the network addresses stored in the navigation history.

8. The method of claim 7, further comprising storing the level of history of the second network address in response to a navigation to the second network address.

9. The method of claim 8, wherein the first and second network addresses are stored in the navigation history.

10. The method of claim 9, further comprising consulting a transport security flag to determine whether to use a secure context for the second address secure communication.

11. The method of claim 10, further comprising changing a status of the transport security flag in response to the detection of the change in a security setting of the second network address.

12. The method of claim 1, further comprising responding to a redirection command generated by an STS (strict transport security) variable.

13. A non-transitory, tangible medium including instructions that, when executed on a processor of an electronic system, comprise:
  detecting a first navigation command of a network-enabled application to navigate from a first address secure connection established with a first network address and to navigate to a second network address using an unsecure reference;
  detecting a change in a security setting of the second network address from an unsecure setting to a secure setting, wherein the second address secure connection is established in response to a redirection command transmitted from the second network address, wherein the redirection command includes a command to connect to the second network address using HTTPS (hypertext transfer protocol secure; and
  filtering, in response to the detection of the change in a security setting of the second network address, referring information in a second navigation command used to establish a second address secure connection using the second network address, wherein the referring information is included in a referrer header to be sent to the second network address; and wherein the detecting the first navigation command, the detecting the change in the security setting, and the filtering referring information occur in a client machine.

14. The medium of claim 13, further comprising consulting a navigation history to identify whether the second network address is associated with a mapping of secure-to-unsecure URLs (universal resource locators).

15. The medium of claim 14, wherein the navigation history includes an indication of a level of a security context associated with each of the network addresses stored in the navigation history.

16. The medium of claim 15, further comprising generating a warning signal in response to the detection of the change in a security setting of the second network address and taking a protective action in response to the warning signal.

17. The medium of claim 16, further comprising responding to a redirection command generated by an STS-enabled (strict transport security) variable.

18. A client machine, comprising:
  a memory that comprises a transport security controller that is arranged in the memory of the client machine to detect a first navigation command of a network-enabled application to navigate from a secure connection established with a first network address and to navigate to a second network address using an unsecure reference, wherein the transport security controller is further arranged to detect a change in a security setting of the second network address from an unsecure setting to a secure setting, wherein the second address secure connection is established in response to a redirection command transmitted from the second network address, wherein the redirection command includes a command to connect to the second network address using HTTPS (hypertext transfer protocol secure); and
  a filter that is arranged to filter in the memory of the client machine, in response to the detection of the change in a security setting of the second network address, referring information in a second navigation command used to establish a second address secure connection with a device having the second network address, wherein the referring information is included in a referrer header to be sent to the second network address.

19. The client machine of claim 18, further comprising consulting a navigation history to identify whether the second network address is associated with a mapping of secure-to-unsecure URLs (universal resource locators).

20. The client machine of claim 19, further comprising consulting a transport security flag to determine whether to use a secure context for the second address secure communication.

21. The client machine of claim 18, wherein the transport security controller is further arranged to generate a warning signal in response to the detection of the change in a security setting of the second network address and to take a protective action in response to the warning signal.

22. The client machine of claim 21, further comprising a navigation history that is arranged having an indication of a level of a security context associated with each of the network addresses stored in the navigation history.

23. The client machine of claim 22, wherein the transport security controller is arranged to store the level of history of the second network address in response to a navigation to the second network address.

24. The client machine of claim 23, wherein the transport security controller is arranged to consult a transport security flag.

25. The client machine of claim 22, wherein the transport security controller is arranged to respond to a redirection command generated within an STS-enabled (strict transport security) connection.

26. The client machine of claim 21, wherein the transport security controller is arranged to set the transport security flag in response to an STS-enabled (strict transport security) variable.

27. The client machine of claim 26, wherein the transport security controller is arranged to change a status of the transport security flag in response to the detection of the change in a security setting of the second network address.

* * * * *